US00RE47613E

(19) United States
(12) Reissued Patent
Bi et al.

(10) Patent Number: US RE47,613 E
(45) Date of Reissued Patent: Sep. 17, 2019

(54) SYSTEM AND METHOD FOR PRIMARY POINT HANDOVERS

(71) Applicant: Futurewei Technologies, Inc., Plano, TX (US)

(72) Inventors: Hao Bi, Lake Zurich, IL (US); Yishen Sun, Buffalo Grove, IL (US)

(73) Assignee: FUTUREWEI TECHNOLOGIES, INC., Plano, TX (US)

(21) Appl. No.: 14/876,481

(22) Filed: Oct. 6, 2015

Related U.S. Patent Documents

Reissue of:
(64) Patent No.: 8,724,590
Issued: May 13, 2014
Appl. No.: 13/343,291
Filed: Jan. 4, 2012

(51) Int. Cl.
*H04B 7/024* (2017.01)
*H04W 72/04* (2009.01)
(Continued)

(52) U.S. Cl.
CPC ..... *H04W 36/0055* (2013.01); *H04B 7/024* (2013.01); *H04L 5/0035* (2013.01);
(Continued)

(58) Field of Classification Search
CPC ..... H04W 36/28; H04W 24/00; H04W 36/18; H04W 72/0406; H04W 72/042; H04W 72/04; H04B 7/024; H04L 15/0035
(Continued)

(56) References Cited

U.S. PATENT DOCUMENTS

2010/0304682 A1* 12/2010 Choi et al. ..... 455/63.1
2011/0268007 A1* 11/2011 Barany et al. ..... 370/312
2012/0252462 A1* 10/2012 Fahldieck ..... 455/438

FOREIGN PATENT DOCUMENTS

EP 2 398 155 A1 * 10/2009 ..... H04B 7/02
EP 2 337 400 B1 * 12/2009 ..... H04W 36/32
(Continued)

OTHER PUBLICATIONS

"3rd Generation Partnership Project; Technical Specification Group Services and System Aspects; General Packet Radio Service (CPRS) Enhancements for Evolved Universal Terrestrial Radio Access Network (E-UTRAN) access (Release 10)," 3GPP TS 23.401, V10.4.0, Jun. 2011, 281 pages.
(Continued)

*Primary Examiner* — Matthew E Heneghan
(74) *Attorney, Agent, or Firm* — Slater Matsil, LLP

(57) ABSTRACT

A method for operating a multiple point (MP) controller includes receiving, from a source primary point, a handover required message for a user equipment coupled to the source primary point, the handover required message including target primary point information and MP radio bearer information. The method also includes determining an MP configuration according to the handover required message, and sending, to a target primary point, a handover request message including the MP configuration and the MP radio bearer information. The method further includes sending, to the source primary point, a handover message including the MP configuration, the MP radio bearer information, and reconfiguration information for the user equipment, the handover message initiating a handover of a subset of the MP radio bearer from the source primary point to the target primary point, and receiving, from the target primary point, a handover complete message.

20 Claims, 12 Drawing Sheets

(51) Int. Cl.

| | |
|---|---|
| ***H04W 36/00*** | (2009.01) |
| ***H04L 5/00*** | (2006.01) |
| *H04W 24/00* | (2009.01) |
| *H04W 36/18* | (2009.01) |

(52) U.S. Cl.
CPC ..... *H04W 72/042* (2013.01); *H04W 72/0406* (2013.01); *H04W 24/00* (2013.01); *H04W 36/18* (2013.01); *H04W 72/04* (2013.01)

(58) Field of Classification Search
USPC ..... 370/331, 332, 334
See application file for complete search history.

(56) References Cited

FOREIGN PATENT DOCUMENTS

| | | | |
|---|---|---|---|
| EP | 2337400 | 6/2011 | |
| EP | 2398155 | 12/2011 | |
| WO | WO 2010003501 A2 * | 1/2010 | ..... H04W 36/0022 |

OTHER PUBLICATIONS

"Upper Layer (Layer 3) Signaling Standard for cdma2000 Spread Spectrum Systems Release 0," 3GPP2, C.50005-0, Version 3.0, Jun. 15, 2000, 1168 pages.

Ericsson, "LTE-Advanced—Coordinated Multipoint transmission/reception", Jun. 30, 2008, TSG-RAN WG1 #53 bis, all pages.

Huawei, "CoMP clarification of definitions and TP", Sep. 29, 2009, 3GPP TSG RAN WG1#54 bis, all pages.*

"3rd Generation Partnership Project; Technical Specification Group Radio Access Network; Evolved Universal Terrestrial Radio Access (E-UTRA); Packet Data Convergence Protocol (PDCP) specification (Release 8)," Technical Specification, 3GPP TS 36.323, V8.6.0, Jun. 2009, 24 pages.

"3rd Generation Partnership Project; Technical Specification Group Radio Access Network; Evolved Universal Terrestrial Radio Access (E-UTRA); Packet Data Convergence Protocol (PDCP) specification (Release 9)," Technical Specification, 3GPP TS 36.323, V9.0.0, Dec. 2009, 24 pages.

"3rd Generation Partnership Project; Technical Specification Group Radio Access Network; Evolved Universal Terrestrial Radio Access (E-UTRA); Packet Data Convergence Protocol (PDCP) specification (Release 10)," Technical Specification, 3GPP TS 36.323, V10.1.0, Mar. 2011, 26 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release10)," 3GPP TS 36.300, V10.4.0, Jun. 2011, 194 pages.

"3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331, V10.2.0, Jun. 2011, 294 pages.

"3rd Generation Partnership Project; Technical Specification Group Radio Access Network; Radio Resource Control (RRC); Protocol specification (Release 10)," 3GPP TS 25.331, V10.5.0, Sep. 2011, 1882 pages.

* cited by examiner

SYSTEM AND METHOD FOR PRIMARY POINT HANDOVERS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue application of U.S. Pat. No. 8,724,590. More than one reissue application has been filed for the reissue of U.S. Pat. No. 8,724,590. The reissue applications are (1) the present application, U.S. patent application Ser. No. 14/876,481, and (2) U.S. patent application Ser. No. 16/002,213, which is a divisional of the present application, and also an application for reissue of U.S. Pat. No. 8,724,590.*

TECHNICAL FIELD

The present invention relates generally to digital communications, and more particularly to a system and method for primary point handovers.

BACKGROUND

In order to achieve better channel utilization and increase overall performance, multiple transmission and multiple reception antennas (also commonly referred to as multiple input, multiple output (MIMO)) at both evolved Node B (eNB) (or base station (BS), Node B (NB), communications controller, and the like) and User Equipment (UE) (or mobile station (MS), terminal, user, subscriber, subscriber equipment, and the like) are considered.

An extension to MIMO makes use of multiple communications points (each of which may be a set of geographically co-located transmit or receive antennas) to transmit or receive to or from a single UE or a group of UEs. As an example, the transmissions from the multiple transmission points may occur at the same time and/or the same frequency, or they may occur at different times and/or at different frequencies so that the UE (or the group of UEs) will receive transmissions from all of the multiple transmission points over a time window. This operating mode may often be referred to as multiple point transmission. As an example, at a first time, a first transmission point may transmit to a UE, at a second time, a second transmission point may transmit to the UE, and so on. Here the second time may or may not be the same as the first time.

Coordinated multiple point (CoMP) transmission is one form of multiple point transmission, wherein the transmissions made by the multiple transmission points are coordinated so that the UE or the group of UEs may be able to either combine the transmissions made by the multiple transmission points or avoid interference to improve overall performance. A transmission point may be an eNB, a part of an eNB (i.e., a cell), a remote radio head (RRH) connected to an eNB, or so on. It is noted that sectors of the same site, e.g., an eNB, correspond to different transmission points. Similarly, CoMP reception involves the reception of a transmitted signal(s) at multiple geographically separated reception points.

CoMP transmission and reception is being considered for inclusion in next generation wireless communications systems, such as in Third Generation Partnership Project (3GPP) Long Term Evolution (LTE) Advanced standards compliant communications systems, as a tool to improve the coverage of high data rates, cell-edge throughput, and/or to increase overall communications system throughput in both high load and low load scenarios.

Generally, a handover (HO), which is also commonly referred to as a handoff, occurs when a user equipment changes from being served by a first communications point to being served by a second communications point.

SUMMARY OF THE INVENTION

Example embodiments of the present invention which provide a system and method for primary point handovers.

In accordance with an example embodiment of the present invention, a method for operating a multiple point (MP) controller is provided. The method including receiving, from a source primary point, a handover required message for a user equipment coupled to the source primary point, the handover required message including target primary point information and MP radio bearer information for an MP radio bearer. The method also includes determining an MP configuration according to the handover required message, and sending, to a target primary point, a handover request message including the MP configuration and the MP radio bearer information. The method further includes sending, to the source primary point, a handover message including the MP configuration, the MP radio bearer information, and reconfiguration information for the user equipment, the handover message initiating a handover of a subset of the MP radio bearer from the source primary point to the target primary point, and receiving, from the target primary point, a handover complete message indicating completion of the handover.

*In accordance with the above example embodiment, the handover required message may include non-MP radio bearer information for a non-MP radio bearer. The determining of the MP configuration may include removing the non-MP radio bearer from the source primary point, and adding the non-MP radio bearer at the target primary point. The handover complete message may include an update to the MP radio bearer information.*

In accordance with another example embodiment of the present invention, a method for operating a source primary point is provided. The method includes determining that a condition for a handover for a user equipment coupled to the source primary point is met, and sending a handover required message for the user equipment, the handover required message including target primary point information and MP radio bearer information for an MP radio bearer. The method also includes receiving a handover message including a MP configuration, the MP bearer information, and reconfiguration information for the user equipment, the handover message initiating a handover of a subset of the MP radio bearer from the source primary point to a target primary point. The method further includes sending, to the user equipment, the reconfiguration information for the user equipment, sending, to the target primary point, status information for a transfer of the MP radio bearer, and receiving, from the target primary point, a handover complete message.

In accordance with another example embodiment of the present invention, a method for operating a target primary point is provided. The method includes receiving a handover request message for a user equipment coupled to a source primary point, the handover request message including a multiple point (MP) configuration and MP radio bearer information for an MP radio bearer. The method also includes reserving a resource for a subset of the MP radio bearer, sending a handover request response message including second MP radio bearer information for the subset of the MP radio bearer. The method further includes transferring the subset of the MP radio bearer from the source primary point, receiving, from the user equipment, a reconfiguration complete message, and sending, to the source primary point, a handover complete message.

In accordance with another example embodiment of the present invention, a multiple point (MP) controller is provided. The MP controller includes a receiver, a processor operatively coupled to the receiver, and a transmitter operatively coupled to the processor and to the receiver. The receiver receives, from a source primary point, a handover required message for a user equipment coupled to the source primary point, the handover required message including target primary point information and MP radio bearer information for an MP radio bearer, and receives, from a target primary point, a handover complete message indicating completion of a handover. The processor determines an MP configuration according to the handover required message. The transmitter sends, to the target primary point, a handover request message including the MP configuration and the MP radio bearer information, and sends, to the source primary point, a handover message including the MP configuration, the MP radio bearer information, and reconfiguration information for the user equipment, the handover message initiating a handover of a subset of the MP radio bearer from the source primary point to the target primary point.

*In accordance with the above example embodiment, the handover required message may include non-MP radio bearer information for a non-MP radio bearer. The processor may be configured to remove the non-MP radio bearer from the source primary point, and add the non-MP radio bearer at the target primary point. The handover complete message may include an update to the MP radio bearer information.*

In accordance with another example embodiment of the present invention, a source primary point is provided. The source primary point includes a processor, a transmitter operatively coupled to the processor, and a receiver operatively coupled to the processor. The processor determines that a condition for a handover for a user equipment coupled to the source primary point is met. The transmitter sends a handover required message for the user equipment, the handover required message including target primary point information and multiple point (MP) radio bearer information for an MP radio bearer, and sends, to the user equipment, reconfiguration information for the user equipment. The transmitter sends, to the target primary point, status information for a transfer of the MP radio bearer. The receiver receives a handover message including a MP configuration, the MP bearer information, and the reconfiguration information for the user equipment, the handover message initiating a handover of a subset of the MP radio bearer from the source primary point to a target primary point, and receives, from the target primary point, a handover complete message.

One advantage of an embodiment is that radio bearer control techniques, as well as establishment, modification, and/or mobility techniques, in a multiple point environment are presented. Therefore, handovers in a multiple point environment are supported without having stringent timing requirements on a backhaul between the communications points, which simplify implementation.

A further advantage of an embodiment is that techniques for handovers in a multiple point environment without requiring significant hardware, which helps to keep costs low.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present invention provides many applicable inventive concepts that can be embodied in a wide variety of specific contexts. The specific embodiments discussed are merely illustrative of specific structures of the invention and ways to operate the invention, and do not limit the scope of the invention.

One embodiment of the invention relates to primary point (PP) handovers in a multiple point environment. For example, a multiple point controller, upon receiving a handoff (HO) required message from a source PP, determines changes in a multiple point configuration that is the result of the HO. Changes to the multiple point configuration include: 1) deciding which multiple point radio bearers will remain with the source PP and which will transfer to the target PP with potential modifications to the multiple point radio bearers, and updating the multiple point configuration; and 2) transferring non-multiple point radio bearers to a target PP. Furthermore, through the collaborations among multiple point controller, source and target primary points, and secondary points, the example embodiments also try to 3) ensure that in-order delivery of information is maintained, 4) ensure that Quality of Service (QoS) levels for applications is maintained, as well as 5) generate security information for the target PPs and for secondary point(s) during the change of primary points.

The present invention will be described with respect to example embodiments in a specific context, namely a 3GPP LTE-Advanced compliant communications system. The invention may also be applied, however, to other standards compliant communications systems, such as IEEE 802.16m, WiMAX, and so on, as well as non-standards compliant communications systems that support multiple point transmission.

Figure 1:
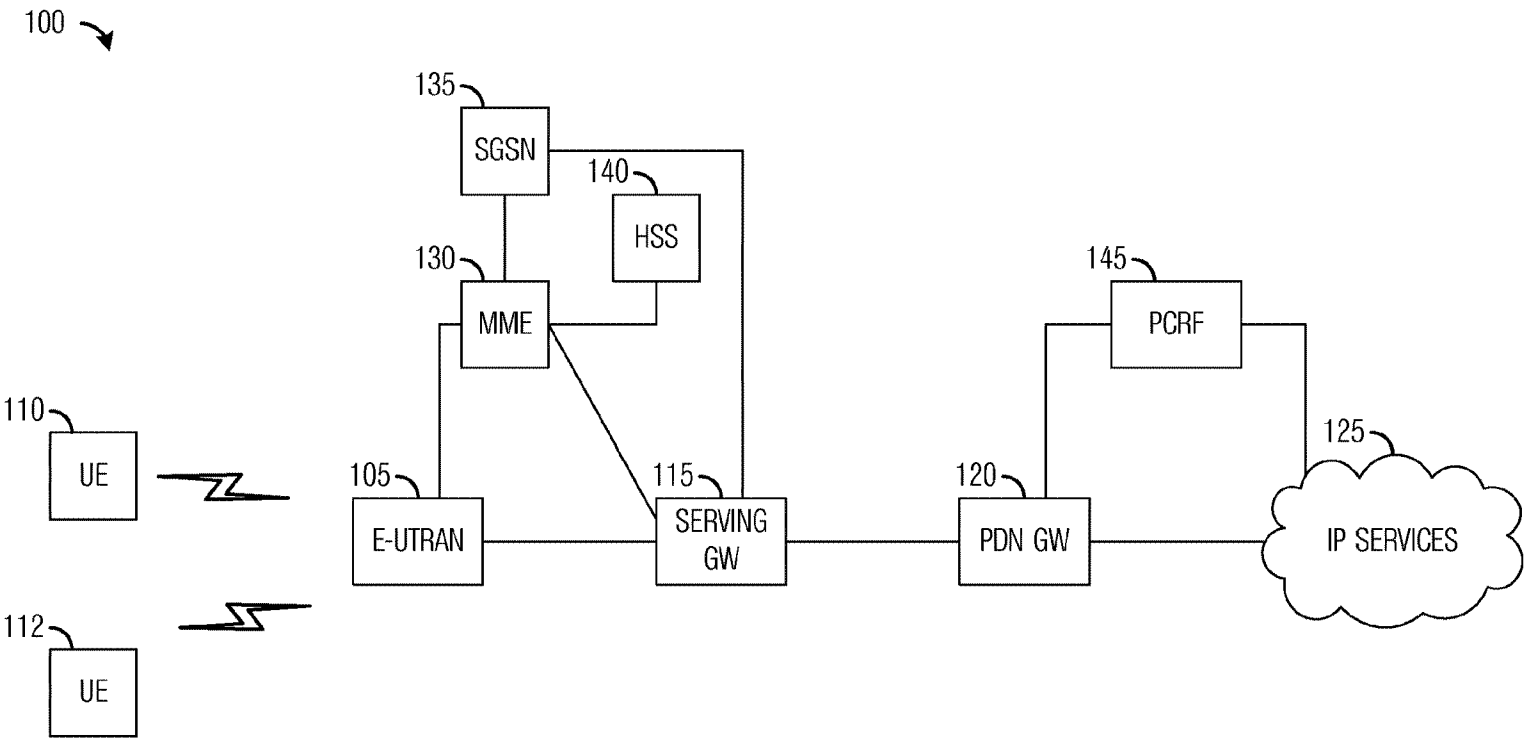
FIG. 1 illustrates an example communications system according to example embodiments described herein.

FIG. 1 illustrates a communications system 100. Communications system 100 includes UE 110 and UE 112 wirelessly accessing services through an Enhanced Universal Mobile Telecommunications System (UMTS) Terrestrial Radio Access Network (E-UTRAN) 105. E-UTRAN 105 includes one or more evolved NodeBs (eNB) that serve the UEs coupled to E-UTRAN 105. The eNB(s) in E-UTRAN provides an air interface for communications system 100. A connection may be setup from a UE through E-UTRAN 105, a serving gateway (serving GW) 115, and a packet data network gateway (PDN GW) 120 to an operator's Internet Protocol (IP) services network 125.

While it is understood that communications systems may employ multiple eNBs capable of communicating with a number of UEs, only one E-UTRAN, two UEs, one serving GW, and one PDN GW are illustrated for simplicity.

Communications system 100 also includes a Mobility Management Entity (MME) 130 that manages UE mobility, such as bearer management services, HOs, and the like. Also, a Serving General Packet Radio Service (GPRS) Support Node (SGSN) 135 is responsible for the delivery of data to and from UEs over a UMTS radio system, a Home Subscriber Server (HSS) 140 is responsible for maintaining subscription related information for UEs, and a Policy Control and Charging Rules Function (PCRF) 145 is responsible for determining policy rules in communications system 100.

Figure 2:
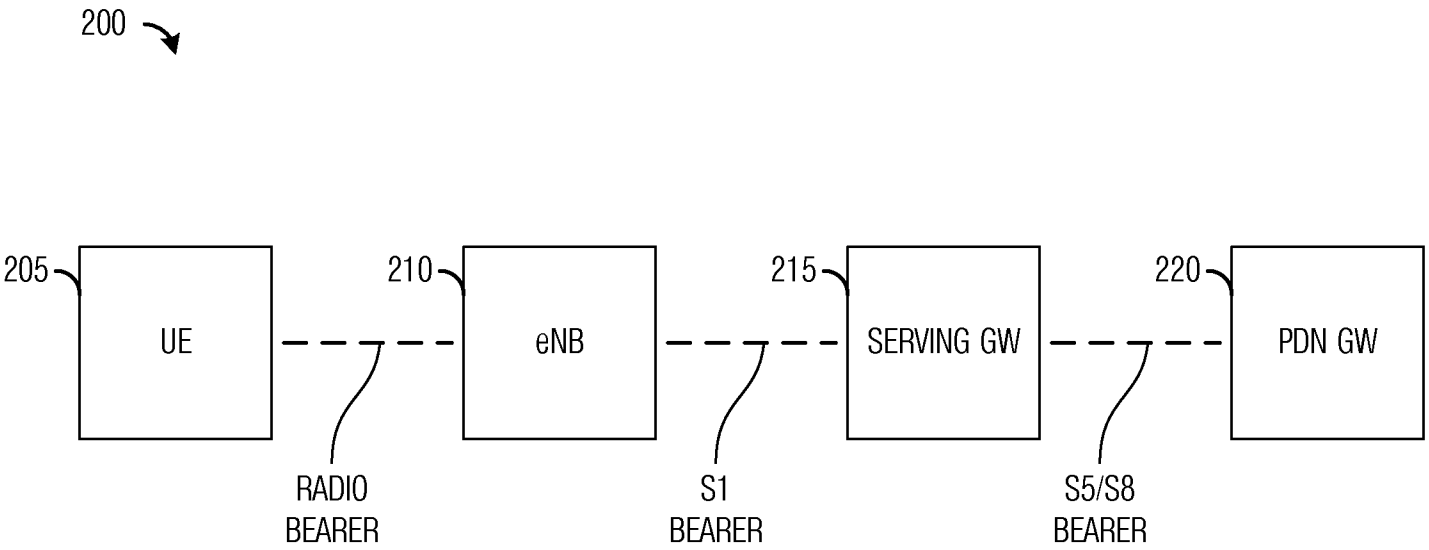
FIG. 2 illustrates an example communications system, wherein a transport of packets is highlighted according to example embodiments described herein.

FIG. 2 illustrates a communications system 200, wherein a transport of packets is highlighted. The transport of packets from PDN GW 220 to UE 205 may be organized through Evolved Packet System (EPS) bearers, which may be radio or wireline bearers. Between PDN GW 220 and serving GW 215, an S5/S8 bearer supports the transport of packets, while between serving GW 215 and eNB 210, an S1 bearer supports the transport of packets. A radio bearer supports the transport of packets between eNB 210 and UE 205. Traffic flows may be aggregated and then sent over respective bearers to their intended destination.

Figure 3:
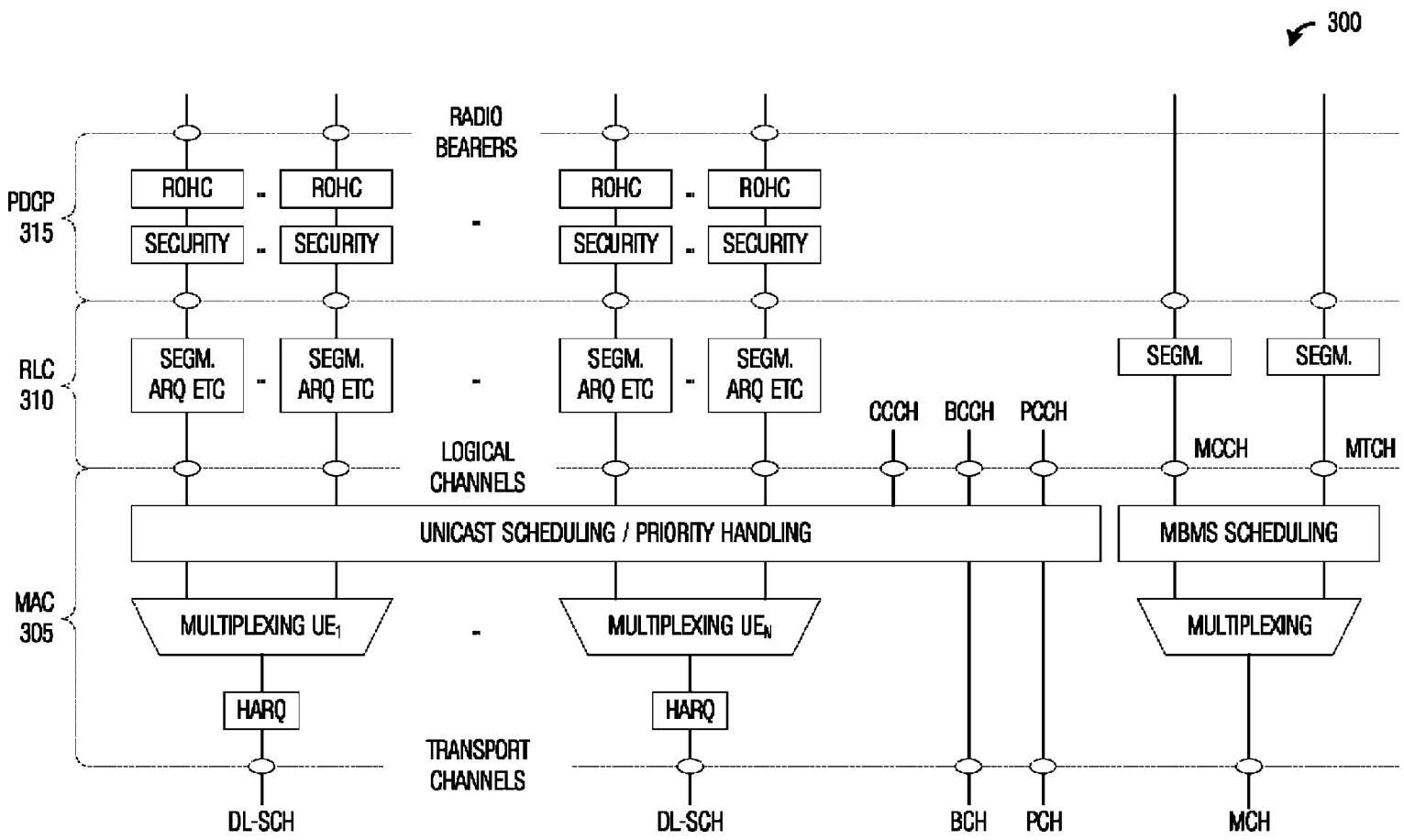
FIG. 3 illustrates an example portion of a protocol stack used in data transmission over a radio bearer according to example embodiments described herein.

FIG. 3 illustrates a portion of a protocol stack 300 used in data transmission over a radio bearer. Protocol stack 300 illustrates a medium access control (MAC) layer 305, a radio link control (RLC) layer 310, and a packet data convergence control (PDCP) layer 315. In current generation 3GPP LTE communications systems (e.g., 3GPP LTE Release-8, Release-9, and Release-10), each radio bearer of a UE is associated with one PDCP entity, and each PDCP entity is associated with one RLC entity for DL transmissions.

Figure 4:
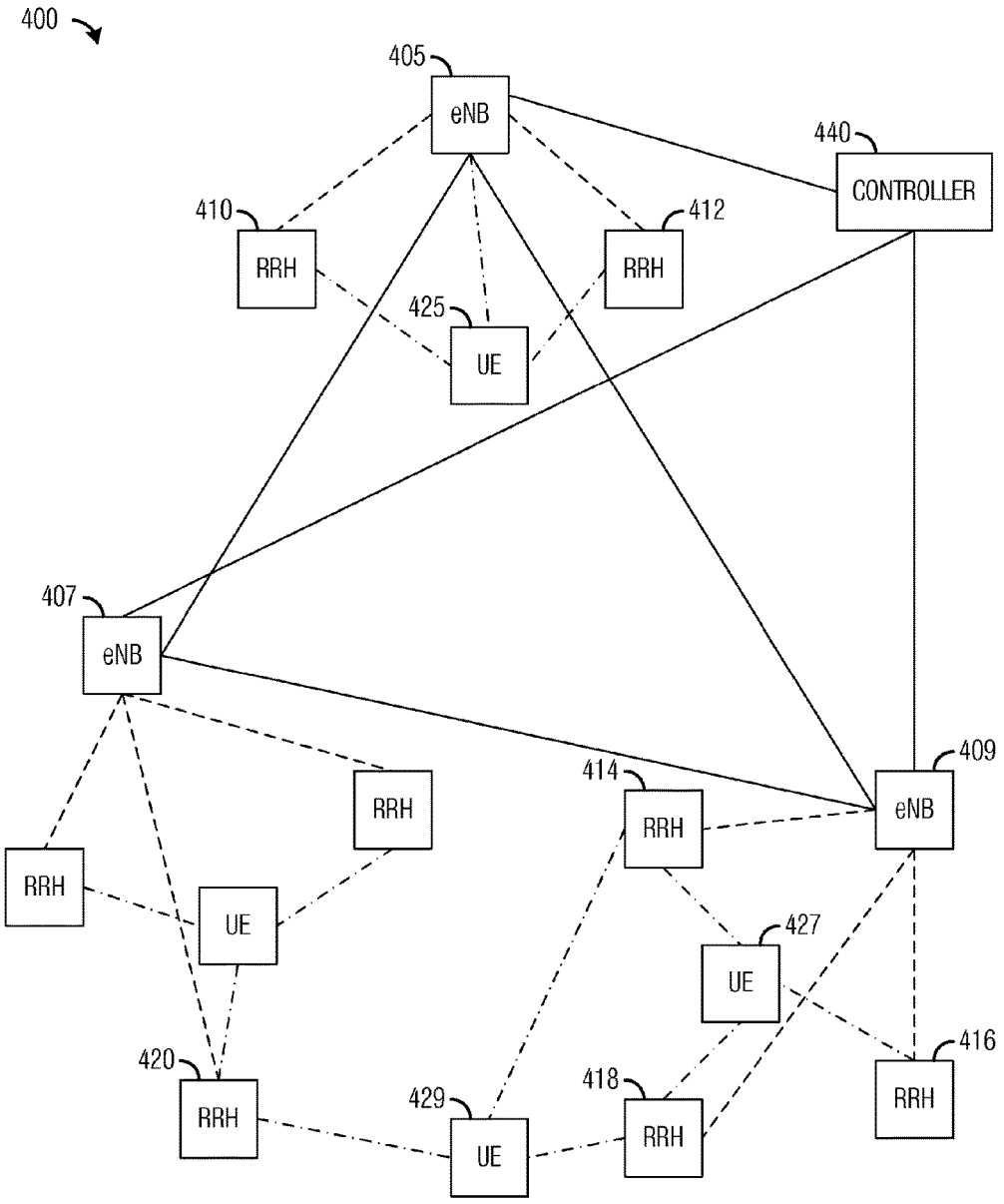
FIG. 4 illustrates an example communications system, wherein DL multiple point transmission (e.g., CoMP transmission) is taking place for some of the UEs operating in a coverage area of communications system according to example embodiments described herein.

FIG. 4 illustrates a communications system 400, wherein DL multiple point transmission (e.g., CoMP transmission) is taking place for some of the UEs operating in a coverage area of communications system 400. Although the discussion of FIG. 4 focuses on eNBs as communications controllers, other types of communications controllers may be used in place of or in conjunction with eNBs. For example, BSs, Low Power Nodes (LPN), femto cells, pico cells, and so on, may be used as replacements of or in conjunction with eNBs. Therefore, the discussion of eNBs should not be construed as being limiting to either the scope or the spirit of the example embodiments.

Furthermore, the discussion presented herein focuses on CoMP transmission. However, the example embodiments presented here are also operable with a more general form of CoMP transmission, i.e., multiple point transmission. Therefore, the discussion of CoMP transmission should not be construed as being limiting to either the scope or the spirit of the example embodiments.

Communications system 400 includes a number of eNBs, such as eNB 405, eNB 407, and eNB 409, and a number of remote radio heads (RRH), such as RRH 410, RRH 412, RRH 414, RRH 416, RRH 418, and RRH 420. RRHs may also be referred to as remote radio units (RRU). Communications system 400 also includes a number of UEs, such as UE 425, UE 427, and UE 429. The UEs may be served by one or more eNBs, one or more RRHs, or a combination of eNBs and RRHs. The eNBs may allocate a portion of their bandwidth to the RRHs in order to help improve coverage, performance, and so forth.

As shown in FIG. 4, UE 425 may be served by RRH 410 and RRH 412, as well as eNB 405. While UE 427 may be served by RRH 414, RRH 416, and RRH 418. UE 429 may be served by RRHs controlled by different eNBs, such as RRH 414 and RRH 418 (controlled by eNB 409) and RRH 420 (controlled by eNB 407).

A communications point within a DL serving set may be referred to as a primary communications point (or simply primary or primary point) and the remaining communications point(s) in the DL serving set may be referred to as secondary communications point(s) (or simply secondary, secondary point, secondaries, or secondary points). The primary communications point may be considered to be a controlling communications point, responsible for assigning identification information, distributing DL data to the secondary communications points, and so forth.

Communications points, such as eNBs, cells of eNBs, RRHs, and so forth, involved in a multiple point operation form a multiple point cooperating set. Furthermore, when the communications points are involved in CoMP operation, the communications points form a CoMP cooperating set. The communications points may be associated with a single cell or different cells. A network pre-connected, UE assisted approach can be taken to configure a CoMP cooperating set for a UE. Based on the condition of channels between a UE and a set of communications points, which are pre-connected to allow inter-communications point communications, a CoMP cooperating set may be dynamically setup for an application's data bearer to include communications points with congenial channel characteristics.

Among members of a CoMP cooperating set, the primary communications point may be responsible for UE specific signaling, including paging. Other members of the CoMP cooperating set may contribute to data communications.

Communications system 400 also includes a controller 440 that may control multiple point operations in one or more multiple point cooperating sets. As an example, controller 440 may determine multiple point configurations, changes to multiple point cooperating sets, initiate handovers, and the like. There may be a single global controller or multiple localized controllers. The global controller may control multiple point operations in an entire communications system, while localized controllers may control multiple point operations in a local region, which may include one or more multiple point cooperating sets. According to an alternative embodiment, a point within a multiple point cooperating set may serve as a controller for the multiple point cooperating set.

Figure 5:
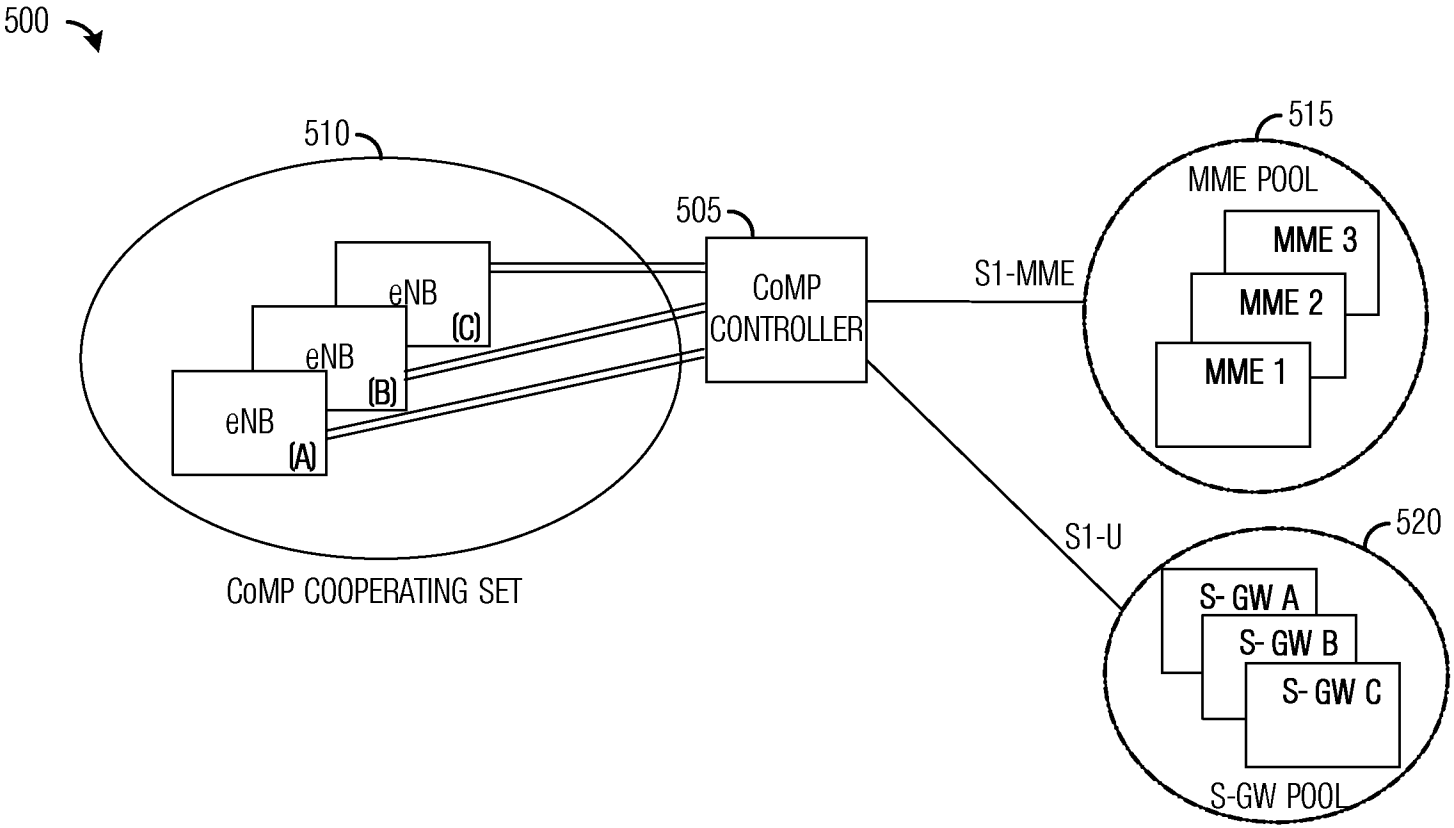
FIG. 5 illustrates an example logical view of a communications system, highlighting a CoMP cooperating set and a CoMP controller according to example embodiments described herein.

FIG. 5 illustrates a logical view of a communications system 500, highlighting a CoMP cooperating set and a CoMP controller. As shown in FIG. 5, a CoMP controller 505 may be viewed as a centralized control point with a CoMP cooperating set 510. CoMP controller 505 may provide a unified control for setting up, configuring CoMP communications for radio bearers, coordinating the operation of multiple communications points within CoMP cooperating set 510, and so on. CoMP controller 505 may be realized as a separate physical entity connecting all (existing as well as potential) communications points of CoMP cooperating set 510. Alternatively, CoMP controller 505 may be a logical function co-located within an existing network entity, such as an eNB.

Communications system 500 also includes a MME pool 515 that may be responsible for providing MMEs that may be used for radio bearer activation and/or deactivation, as well as UE tracking and paging procedures. MME pool 515 may include a number of MMEs that may be assigned to assist a CoMP controller (such as CoMP controller 505) when the CoMP controller has a need for radio bearer management, and so on. Assigned MMEs may be released once they are no longer needed or another one becomes better suited to the purpose.

Communications system 500 also includes a serving gateway (S-GW) pool 520 that may be responsible for providing S-GWs that may be used as point of entry and/or exit for traffic to or from a UE. S-GW pool 520 may include a number of S-GWs that may be assigned when needed and released when no longer needed or another one becomes better suited to the purpose.

As discussed previously, in a standard cellular HO, a radio bearer(s) associated with a UE at a source communications point is transferred to a target communications point and the UE continues to receive information from the target communications point and to transmit information to the target communications point.

However, in a multiple point environment, where a UE may transmit to or receive transmissions from multiple communications points, several different forms of multiple point HOs may take place. In a first form of multiple point HO, no change in the PP occurs. However, radio bearers involved in multiple point operation are transferred from a first SP to a second SP. In a second form of multiple point HO, there is a change in the PP associated with the UE. When there is a change in the PP associated with the UE, it may be necessary to move signaling radio bearers and non-multiple point radio bearers from a source PP to a target PP, as well as a subset of multiple point radio bearers to the target PP from the source PP, while potentially retaining a remainder of the multiple point radio bearers at the source PP (potentially with modification to their Radio Resource Management and/or Quality of Service (RRM/QoS) parameters. Furthermore, an updated multiple point (MP) configuration, and a configuration of radio bearers on the source PP and the target PP may be determined based on channel condition reports. QoS levels for an application (e.g., aggregated over radio bearers for communications points involved in the multiple point operation) are also maintained during the multiple point HO.

Figure 6:
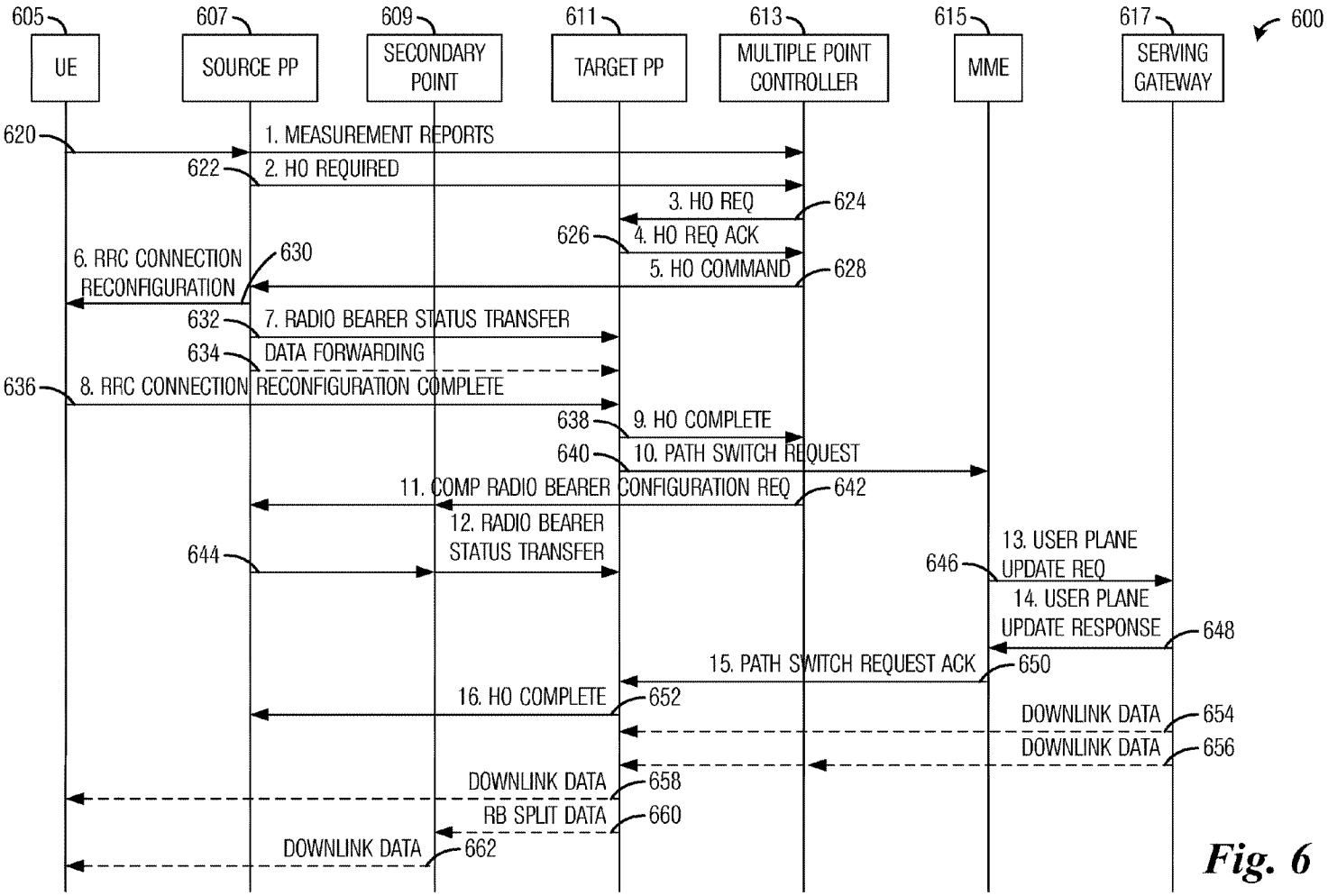
FIG. 6 illustrates an example message exchange occurring in a multiple point HO where there is a change in primary point (PP) of a multiple point operating set associated with the UE according to example embodiments described herein.

FIG. 6 illustrates a message exchange 600 occurring in a multiple point HO where there is a change in PP of a multiple point operating set associated with the UE. Message exchange 600 highlights messages exchanged between a UE 605, a source PP 607, a secondary point 609, a target PP 611, a multiple point controller 613, a MME 615, and a serving gateway 617, in performing a multiple point HO where there is a change in PP of a multiple point operating set associated with the UE.

Although the discussion presented herein focuses on the entities involved in the multiple point HO (e.g., UE 605, source PP 607, secondary point 609, target PP 611, multiple point controller 613, MME 615, and serving gateway 617) as separate entities, some of the entities may be implemented as logical entities located at a physical entity. As an example, multiple point controller 613 may be implemented as a logical entity and implemented in source PP 607, target PP 611, or MME 615.

UE 605 may send a measurement report to source PP 607 (shown as event 620). According to an example embodiment, the measurement report is in the form of a Reference Signal Received Power (RSRP) report or a Reference Signal Received Quality (RSRQ) report. The measurement may be performed at UE using cell reference signals (CRS) or channel state information reference signals (CSI-RS). UE 605 may be configured to periodically or at specific times send a measurement report to source PP 607. UE 605 may alternatively be configured to send a measurement report to source PP 607 upon an occurrence of an event, such as a reception of a measurement report request, a metric (such as an error rate, a data rate, a cell's signal strength, the difference between two cells' signal strengths, and the like) meeting a specified threshold, a cell's signal strength becomes better than a first threshold and another cell's signal strength becomes lower than a second threshold, and the like. Source PP 607 may also forward the measurement report from UE 605 to multiple point controller 613.

Based on the measurement report, source PP 607 may send a first message including a HO required indicator to multiple point controller 613 (shown as event 622). As an example, source PP 607 may determine if a HO is required by comparing information contained in the measurement report with one or more conditions and if one or more conditions is met, source PP 607 determines that the HO is required. The conditions include a signal strength measurement of source PP 607 meeting a signal threshold, a signal strength measurement of target PP 611 exceeding a signal strength measurement of source PP 607, signal strength measurement of several target PPs exceeding a signal strength measurement of source PP 607, and the like.

According to an example embodiment, the first message includes identity information of target PP 611 and its security key information, including but not limited to {eNB key ($K_{eNB^*}$), Next hop Chaining Counter (NCC)}. The first message also includes identifying information for radio bearers to be handed over to target PP 611.

Although the discussion focuses on source PP 607 initiating the multiple point HO by transmitting the first message including the HO required indicator to multiple point controller 613, other network entities may initiate the multiple point HO. As an example, a centralized network entity or a locally centralized network entity having access to the measurement reports from UE 605 as well as neighbor information of source PP 607 can initiate the multiple point HO by transmitting a message including the HO required indicator to multiple point controller 613. In such a situation, the message from the centralized network entity may need to specify identity information about source PP 607, as well as target PP 611 and other information contained in the first message.

Multiple point controller 613, upon receiving the first message with the HO required indicator, may determine a change in the multiple point configuration using the information provided by source PP 607. Changes to the multiple point configuration include changes to radio bearers used in multiple point operation at source PP 607 once the multiple point HO completes, changes to radio bearers used in multiple point operation at target PP 611 once the multiple point HO completes, changes to radio bearers not used in multiple point operation at source PP 607 and at target PP 611 once the multiple point HO completes, changes to parameters of the radio bearers, changes to security key information, and the like.

Multiple point controller 613 may begin HO preparation at target PP 611 by sending a second message including a handover request indication (shown as event 624). According to an example embodiment, the second message includes identifying information of signaling and data radio bearers that are to be transferred from source PP 607 to target PP 611, data radio bearers in multiple point operation and associated secondary points along with their RRM/QoS parameters (which may include a status of a multiple point transmission mode, e.g., if a radio bearer split is enacted with other secondary points), and the like. The second message also includes security information, such as {eNB key ($K_{eNB^*}$), Next hop Chaining Counter (NCC)}, for target PP 611 for use after completion of the multiple point HO.

Target PP 611 may reserve resources for radio bearers according to information in the second message from multiple point controller 613. Target PP 611 also responds to the second message by sending a third message including a HO request acknowledgement (shown as event 626). According to an example embodiment, the third message includes identity information assigned to UE 605 in target PP 611, as well as received security key information, e.g., NCC. Additionally, for each secondary point independently supporting a data radio bearer for UE 605, target PP 611 may update its security key information, e.g., {$K_{eNB^*}$, NCC}, for the respective secondary point and include an updated NCC in the third message. Furthermore, if source PP 607 becomes a secondary point after completion of the multiple point HO and independently supports a data radio bearer, target PP 611 may generate security key information, e.g., {$K_{eNB^*}$, NCC}, for source PP 607 to use after completion of the multiple point HO.

The security key information, e.g., {$K_{eNB^*}$, NCC}, of the secondary points (potentially including a secondary point that was source PP 607 prior to completion of the multiple point HO) may be selected differently from security key information of target PP 611. As an example, the security key information of the secondary points may be related to the security key information of target PP 611. Additionally, target PP 611 may choose not to change the security key information already assigned to some or all of the secondary points.

Multiple point controller 613 may send a fourth message including a HO command indicator to source PP 607 (shown as event 628). According to an example embodiment, the fourth message (with the HO command indicator) is used to instruct source PP 607 to perform a primary point HO and includes identification information regarding signaling and data radio bearers to be transferred to target PP 611, as well as radio bearers that are to remain with source PP 607 once the multiple point HO completes. The identification information also includes associated parameters, such as RRM/QoS parameters, for the radio bearers for use in multiple point operation.

Additionally, the fourth message includes information for UE 605. According to an example embodiment, the information for UE 605 is contained in a signaling container and includes information regarding the identity assigned to UE 605 in target PP 611, security key information to be used in target PP 611 and the secondary points after completion of the multiple point HO, information about signaling and data radio bearers to be transferred from source PP 607 to target PP 611, information about data radio bearers at source PP 607 and target PP 611 that will continue in multiple point operations, as well as parameters, such as RRM/QoS parameters, of the radio bearers.

Source PP 607 may send a fifth message including a Radio Resource Control (RRC) connection reconfiguration indicator to UE 605 to reconfigure the UE and to start the primary point HO (shown as event 630). According to an example embodiment, the fifth message passes the information for UE 605 (e.g., the signaling container) to UE 605.

Source PP 607 may send a sixth message including a radio bearer status transfer message to target PP 611 to convey the status of radio bearers in multiple point operation (shown as event 632). According to an example embodiment, for radio bearers that are split over multiple communications points, their downlink PDCP sequence number transmitter status and logical channel identities associated with involved RLC entities at transmission points are passed to target PP 611. The downlink PDCP sequence number transmitter status provides information to derive a subsequent PDCP sequence number that target PP 611 assigns to new service data units (SDU) not already having been assigned a PDCP sequence number. According to an example embodiment, for radio bearers supported on other secondary points, their identities and associated logical channel identities are passed to target PP 611. Source PP 607 forwards to target PP 611 PDCP protocol data units (PDU) whose delivery has not been confirmed. The forwarding of SDUs and PDUs by source PP 607 to target PP 611 are shown collectively as event 634.

UE 605, utilizing the information from source PP 607 contained in the fifth message, may determine that data packets of UE specific signaling and data radio bearers not participating in multiple point operation are to be sent from target PP 611. UE 605 may also obtain updated parameters, such as RRM/QoS parameters for data radio bearers in multiple point operation. After preparing to receive transmissions from target PP 611, as well as from multiple points in multiple point operation, and updating its security key information, UE 605 connects to target PP 611 and sends a seventh message including a RRC connection reconfiguration complete indicator to target PP 611 (shown as event 636).

Target PP 611, upon receiving the seventh message from UE 605, may send an eighth message including a HO complete indicator to multiple point controller 613 (shown as event 638). According to an example embodiment, for each secondary point independently supporting a data radio bearer, target PP 611 includes updated security key information, e.g., {$K_{eNB^*}$, NCC}, if any in the eighth message.

Target PP 611 may also send a ninth message including a path switch request indicator to MME 615 (shown as event 640). According to an example embodiment, the path switch request indicator informs MME 615 that there has been a change in PP. Furthermore, the ninth message includes information about enumerated evolved packet system (EPS) bearers whose packets should be sent to target PP 611 from now on. The information about the enumerated EPS bearers may be in the form of a list.

Multiple point controller 613 may send a tenth message including a multiple point radio bearer configuration request indication to the secondary point(s) to inform them of completion of the multiple point HO (shown as event 642). According to an example embodiment, the tenth message also includes updates of parameters, such as RRM/QoS parameters for data radio bearers in multiple point operation on the secondary point(s). For secondary point(s) independently supporting a data radio bearer, the tenth message also include updated security key information, e.g., {$K_{eNB^*}$, NCC}, if available. Also, for secondary point(s) independently supporting a data radio bearer, if updated security key information is provided in the tenth message, the updated security information should be utilized. For radio bearers that are split over multiple points, secondary point(s) may stop transmission of PDCP PDUs received from source PP 607.

The secondary point(s) may send an eleventh message including a radio bearer status transfer indicator to target PP 611 to convey the status of radio bearers used in multiple point operation (shown as event 644). While, for radio bearers that are split over multiple points, their downlink PDCP sequence number transmitter status indicates the sequence number of PDCP PDUs whose delivery has been confirmed on a secondary point.

MME 615 may send a twelfth message including a user plane update request indicator to serving gateway 617 (shown as event 646). According to an example embodiment, the twelfth message includes an address of target PP 611, as well as a list of the enumerated EPS bearers whose packets should be sent to target PP 611 from now on.

Serving gateway 617 may send a thirteenth message including a user plane update response indicator to MME 615 (shown as event 648). Serving gateway 617 may also start to send data packets of the enumerated EPS bearers to target PP 611 using the received address (from the twelfth message), shown collectively as event 654 (for radio bearers not in multiple point operation) and event 656 (for radio bearers in multiple point operation).

MME 615 may confirm the path switch with target PP 611 by sending a fourteenth message including a path switch request acknowledgement (shown as event 650). Target PP 611 may send a fifteenth message including a HO complete indicator to source PP 607 (shown as event 652). According to an example embodiment, source PP 607 may release resources previously reserved for radio bearers (both signaling and data radio bearers) that have been moved to target PP 611 after receipt of the fifteenth message. Target PP 611 may send downlink data directly to UE 605 (shown as event 658) or split the downlink data to the secondary point(s) (shown as event 660). The secondary point(s) also send the downlink data to UE 605 (shown as event 662).

In general, packets associated with signaling and/or data radio bearers not in multiple point operation may be sent to target PP 611 for delivery, while packets associated with data radio bearers in multiple point operation are sent to multiple point controller 613 for distribution according to the multiple point configuration. In a situation with data radio bearers supported on a secondary point(s), multiple point controller 613 forwards associated data to corresponding secondary point(s). In a situation with data radio bearers that are split over multiple geographically separated communications points, multiple point controller 613 passes associated data to target PP 611 which then distributes the data through a data splitting interface between a single PDCP entity and multiple RLC entities. Target PP 611 and the secondary point(s) send the data to UE 605.

According to an example embodiment, the various messages described above in the discussion of FIG. 6 may be transmitted on their own or in combination with one or more other messages, e.g., the various messages may be embedded in other messages. Additionally, some of the messages may be transmitted in a different order than what is illustrated and discussed without changing the spirit or the scope of the example embodiments.

Figure 7:
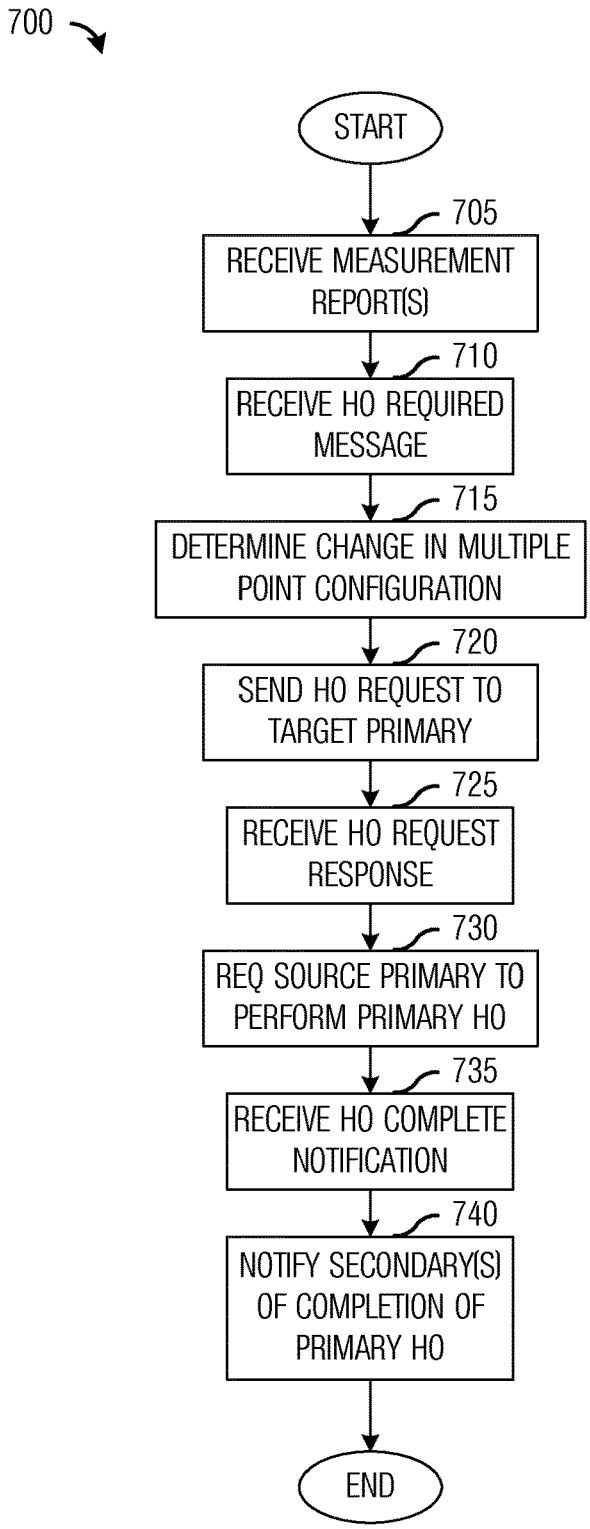
FIG. 7 illustrates an example flow diagram of operations in a multiple point controller as the multiple point controller participates in a multiple point HO according to example embodiments described herein.

FIG. 7 illustrates a flow diagram of operations 700 in a multiple point controller as the multiple point controller participates in a multiple point HO. Operations 700 may be indicative of operations taking place in a multiple point controller, such as controller 440 of FIG. 4, as the multiple point controller participates in a multiple point HO from a source PP to a target PP.

Operations 700 may begin with the multiple point controller receiving a measurement report(s) from the source PP (block 705). The measurement report(s) may be from UE served by the source PP and may be in the form of a RSRP report(s), RSRQ report(s), and the like. The multiple point controller may also receive a first message with a HO required indicator for a UE (block 710). According to an example embodiment, the first message may be sent by the source PP or by a network entity that can initiate HOs. The first message includes identity information of the target PP and its security key information, including but not limited to {eNB key ($K_{eNB^*}$), Next hop Chaining Counter (NCC)}. The first message also includes identifying information for radio bearers to be handed over to target PP.

Based on the information in the first message, multiple point controller may determine a change in the multiple point configuration (block 715). Changes to the multiple point configuration include changes to radio bearers used in multiple point operation at source PP 607 and at target PP 611 once the multiple point HO completes, changes to radio bearers used in multiple point operation at secondary points, changes to parameters of the radio bearers, and the like.

The multiple point controller may send a second message including a handover request indication to the target PP (block 720). According to an example embodiment, the second message includes identifying information of signaling and data radio bearers that are to be transferred from the source PP to the target PP, data radio bearers in multiple point operation and associated secondary points along with their RRM/QoS parameters (which may include a status of a multiple point transmission mode, e.g., if a radio bearer split is enacted with other secondary points), and the like.

The second message also includes security information for the target PP to use after completion of the multiple point HO.

The multiple point controller may receive a third message including a HO request acknowledgement from the target PP (block 725). According to an example embodiment, the third message includes identity information assigned to the UE in the target PP, as well as received security key information, e.g., NCC. Additionally, for each secondary point independently supporting a data radio bearer for the UE, the target PP may update its security key information for the respective secondary point and include an updated NCC in the third message. Furthermore, if the source PP becomes a secondary point after completion of the multiple point HO and independently supports a data radio bearer, the target PP may generate security key information for the source PP to use after completion of the multiple point HO.

The multiple point controller may initiate the multiple point HO by sending a fourth message including a HO command indicator to the source PP (block 730). According to an example embodiment, the fourth message (with the HO command indicator) is used to instruct the source PP to perform a primary point HO and includes identification information regarding signaling and data radio bearers to be transferred to the target PP, as well as radio bearers that are to remain with the source PP once the multiple point HO completes. The identification information also includes associated parameters, such as RRM/QoS parameters, for the radio bearers for use in multiple point operation. Additionally, the fourth message includes information for the UE, which may include but are not limited to: instructions about the identity assigned to UE in the target PP, the NCCs to be used after handover in the target PP and secondary points, signaling and data radio bearers to be transferred from the source PP to the target PP, a list of data radio bearers on the source PP and the target PP to continue the multiple point operation, respective RRM/QoS parameters of the signaling and data radio bearers, and the like.

The multiple point controller may receive a fifth message including a HO complete indicator from the target PP to indicate that the multiple point HO is complete (block 735). The multiple point controller may send a sixth message including a multiple point radio bearer configuration request indication to the secondary point(s) to inform them of completion of the multiple point HO (block 740). According to an example embodiment, the sixth message also includes updates of parameters, such as RRM/QoS parameters for data radio bearers in multiple point operation on the secondary point(s). For secondary point(s) independently supporting a data radio bearer, the sixth message also include updated security key information if available. Also, for secondary point(s) independently supporting a data radio bearer, if updated security key information is provided in the sixth message, the updated security information should be utilized. For radio bearers that are split over multiple points, secondary point(s) may stop transmission of PDCP PDUs received from the source PP.

Figure 8:
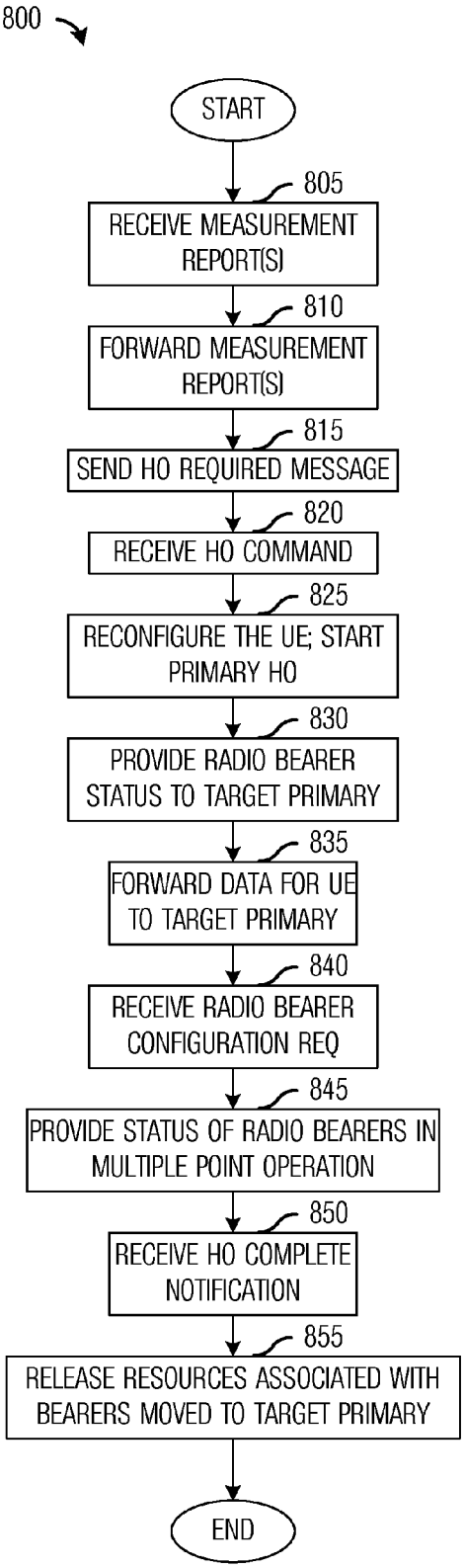
FIG. 8 illustrates an example flow diagram of operations in a source PP as the source PP participates in a multiple point HO according to example embodiments described herein.

FIG. 8 illustrates a flow diagram of operations 800 in a source PP as the source PP participates in a multiple point HO. Operations 800 may be indicative of operations taking place in a source PP, such as an eNB, a RRH, and the like, as the source PP participates in a multiple point HO from the source PP to a target PP.

Operations 800 may begin with the source PP receiving a measurement report(s) from a UE (block 805). The measurement report(s) may be from UE served by the source PP and may be in the form of a RSRP report(s), RSRQ report(s), and the like. The source PP may forward the measurement report(s) to a multiple point controller (block 810).

The source PP, based on information in the measurement report(s), may determine that a multiple point HO is needed and send a first message including a HO required indicator to the multiple point controller (block 815). According to an example embodiment, the first message includes identity information of the target PP and its security key information, including but not limited to $\{K_{eNB^*}, NCC\}$. The first message also includes identifying information for radio bearers to be handed over to the target PP.

The source PP may receive a second message including a second message including a HO command indicator from the multiple point controller (block 820). According to an example embodiment, the second message (with the HO command indicator) instructs the source PP to perform a primary point HO and includes identification information regarding signaling and data radio bearers to be transferred to the target PP, as well as radio bearers that are to remain with the source PP once the multiple point HO completes. The identification information also includes associated parameters, such as RRM/QoS parameters, for the radio bearers for use in multiple point operation.

Additionally, the second message includes information for the UE. According to an example embodiment, the information for the UE is contained in a signaling container and includes information regarding the identity assigned to the UE in the target PP, security key information to be used in the target PP and the secondary points after completion of the multiple point HO, information about signaling and data radio bearers to be transferred from the source PP to the target PP, information about data radio bearers at the source PP and the target PP that will continue in multiple point operations, as well as parameters, such as RRM/QoS parameters, of the radio bearers.

The source PP may reconfigure the UE and start the primary HO (block 825). According to an example embodiment, the target PP may reconfigure the UE and start the primary HO by sending a third message including a Radio Resource Control (RRC) connection reconfiguration indicator to the UE. The third message passes the information for the UE from the second message to the UE.

The source PP may provide radio bearer status to the target PP by sending a fourth message including a radio bearer status transfer message to the target PP to convey the status of radio bearers in multiple point operation (block 830). According to an example embodiment, for radio bearers that are split over multiple communications points, their downlink PDCP sequence number transmitter status and logical channel identities associated with involved RLC entities at communications points are passed to the target PP. The downlink PDCP sequence number transmitter status provides information to derive a subsequent PDCP sequence number that the target PP assigns to new SDUs not already having been assigned a PDCP sequence number. According to an example embodiment, for radio bearers supported on other secondary points, their identities and associated logical channel identities are passed to the target PP. The source PP forwards to the target PP the PDCP PDUs whose delivery has not been confirmed. The forwarding of SDUs and PDUs by the source PP to the target PP are shown collectively as block 835.

The source PP, now operating as a secondary point, may receive a fifth message including a multiple point radio bearer configuration request indication from the multiple point controller that informs the source PP (as well as other secondary points) that the multiple point HO is complete (block 840). According to an example embodiment, the fifth message also includes updates of parameters, such as RRM/QoS parameters for data radio bearers in multiple point operation on the secondary point(s). For secondary point(s) independently supporting a data radio bearer, the fifth message also include updated security key information if available. Also, for secondary point(s) independently supporting a data radio bearer, if updated security key information is provided in the fifth message, the updated security information should be utilized. For radio bearers that are split over multiple points, secondary point(s) may stop transmission of PDCP PDUs received from the source PP.

The source PP may send a sixth message including a radio bearer status transfer indicator to the target PP to convey the status of radio bearers used in multiple point operation (block 845). The source PP may receive a seventh message including a HO complete indicator to the source PP to inform the source PP that the multiple point HO is complete (block 850) and the source PP may release resources previously reserved for radio bearers (both signaling and data radio bearers) that have been moved to the target PP (block 855).

Figure 9:
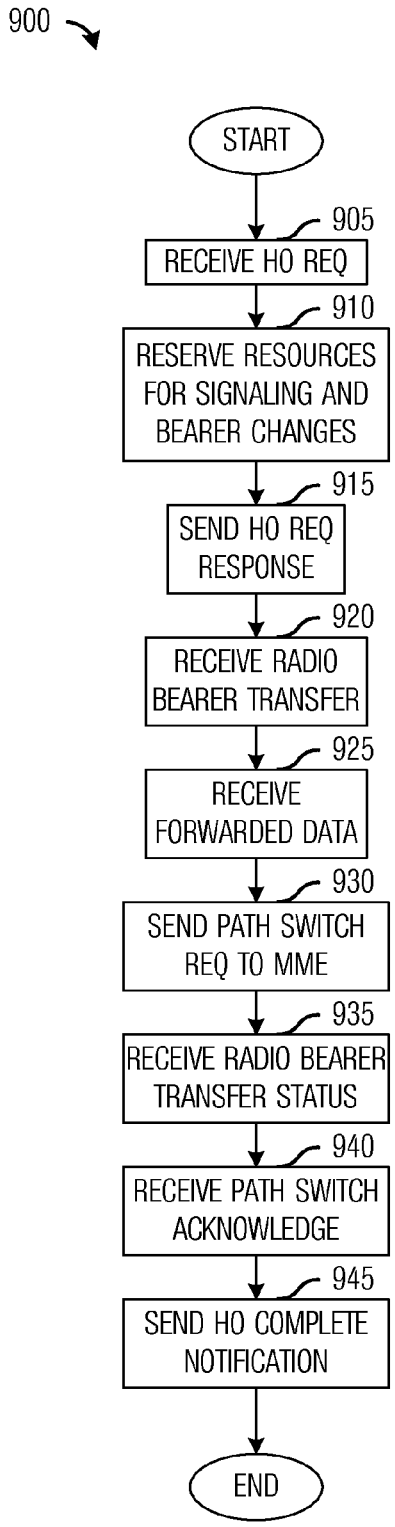
FIG. 9 illustrates an example flow diagram of operation in a target PP as the target PP participates in a multiple point HO according to example embodiments described herein.

FIG. 9 illustrates a flow diagram of operation 900 in a target PP as the target PP participates in a multiple point HO. Operations 900 may be indicative of operations taking place in a target PP, such as an eNB, a RRH, and the like, as the target PP participates in a multiple point HO from a source PP to the target PP.

The target PP may receive a first message including a handover request indication from the multiple point controller (block 905). According to an example embodiment, the first message includes identifying information of signaling and data radio bearers that are to be transferred from the source PP to the target PP, data radio bearers in multiple point operation and associated secondary points along with their RRM/QoS parameters (which may include a status of a multiple point transmission mode, e.g., if a radio bearer split is enacted with other secondary points), and the like. The first message also includes security information for the target PP to use after completion of the multiple point HO.

The target PP may reserve resources for radio bearers according to information in the first message (block 910). The target PP 611 may respond to the first message by sending a second message including a HO request acknowledgement to the multiple point controller (block 915). According to an example embodiment, the second message includes identity information assigned to the UE in the target PP, as well as received security key information, e.g., NCC. Additionally, for each secondary point independently supporting a data radio bearer for the UE, the target PP may update its security key information and include an updated NCC in the second message. Furthermore, if the source PP becomes a secondary point after completion of the multiple point HO and independently supports a data radio bearer, the target PP may generate security key information for the source PP to use after completion of the multiple point HO.

The target PP may receive a second message including a radio bearer status transfer message from the source PP (block 920). According to an example embodiment, for radio bearers that are split over multiple communications points, their downlink PDCP sequence number transmitter status and logical channel identities associated with involved RLC entities at transmission points are passed to the target PP. The downlink PDCP sequence number transmitter status provides information to derive a subsequent PDCP sequence number that the target PP assigns to new SDU not already having been assigned a PDCP sequence number. According to an example embodiment, for radio bearers supported on other secondary points, their identities and associated logical channel identities are passed to the target PP. The target PP also receives from the source PP PDCP PDU whose delivery has not been confirmed. The receipt of SDUs and PDUs from the source PP at the target PP is shown as block 925.

The target PP may also send a third message including a path switch request indicator to a MME (block 930). According to an example embodiment, the path switch request indicator informs the MME that there has been a change in PP. Furthermore, the third message includes information about enumerated evolved packet system (EPS) bearers whose packets should be sent to the target PP from now on. The information about the enumerated EPS bearers may be in the form of a list.

The target PP may receive a fourth message including a radio bearer status transfer indicator from the source PP (now operating as a secondary point) as well as from other secondary points (block 935). According to an example embodiment, the fourth message conveys the status of radio bearers used in multiple point operation. While, for radio bearers that are split over multiple points, their downlink PDCP sequence number transmitter status indicates the sequence number of PDCP PDUs whose delivery has been confirmed on a secondary point.

The target PP may receive a fifth message including a path switch request acknowledgement (block 940). The target PP may send a sixth message including a HO complete indicator to the source PP (block 945).

Figure 10:
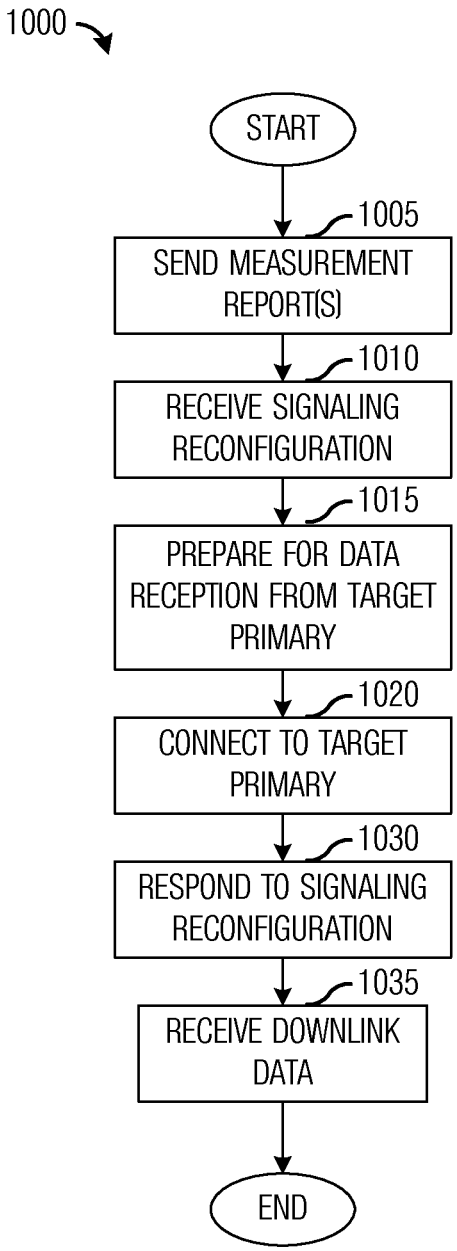
FIG. 10 illustrates an example flow diagram of operations in a UE as the UE participates in a multiple point HO according to example embodiments described herein.

FIG. 10 illustrates a flow diagram of operations 1000 in a UE as the UE participates in a multiple point HO. Operations 1000 may be indicative of operations taking place at a UE, such as UE 425, UE 429, and the like, as the UE participates in a multiple point HO from a source PP to a target PP.

The UE may send a measurement report to the source PP (block 1005). According to an example embodiment, the measurement report may be in the form of a Reference Signal Received Power (RSRP) report, a RSRQ report, and the like. The measurement may be performed at UE on cell reference symbols (CRS) or channel state information reference symbols (CSI-RS). The UE may be configured to periodically or at specific times send a measurement report to the source PP. The UE may alternatively be configured to send a measurement report to the source PP upon an occurrence of an event, such as a reception of a measurement report request, a metric (such as an error rate, a data rate, a cell's signal strength, the difference between two cells' signal strengths, and the like) meeting a specified threshold, a cell's signal strength becomes better than a first threshold and another cell's signal strength becomes lower than a second threshold, and the like.

The UE may receive a first message including a Radio Resource Control (RRC) connection reconfiguration indicator from the source PP to reconfigure the UE and to start the primary point HO (block 1010). According to an example embodiment, the first message passes the information for the UE (e.g., the signaling container sent by the multiple point controller) to the UE, which may include but are not limited to: instructions about the identity assigned to UE in the target PP, the NCCs to be used after handover in the target PP and secondary points, signaling and data radio bearers to be transferred from the source PP to the target PP, a list of data radio bearers on the source PP and the target PP to continue the multiple point operation, respective RRM/QoS parameters of the signaling and data radio bearers, and the like.

The UE may prepare for data reception from transmissions made by the target PP (block 1015). According to an example embodiment, the UE, utilizing the information sent by the multiple point controller, may determine that data packets of UE specific signaling and data radio bearers not participating in multiple point operation are to be sent from the target PP. The UE may also obtain updated parameters, such as RRM/QoS parameters for data radio bearers in multiple point operation. The UE may also connect to the target PP (block 1020) and respond to the first message by sending a second message including a RRC connection reconfiguration complete indicator to the target PP (block 1030). The UE may also begin to receive DL data (block 1035).

Figure 11:
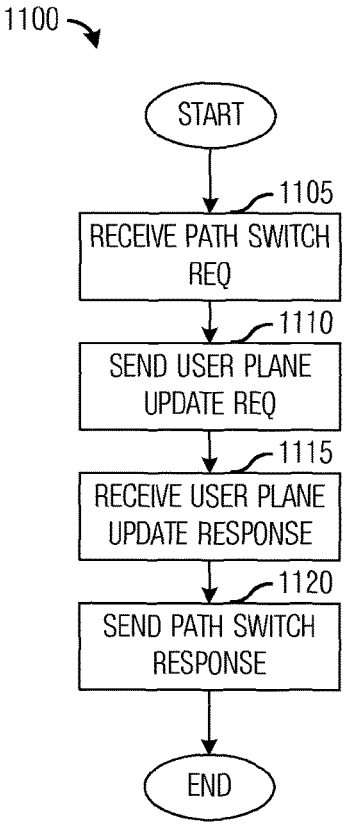
FIG. 11 illustrates an example flow diagram of operations in a MME as the MME participates in a multiple point HO according to example embodiments described herein.

FIG. 11 illustrates a flow diagram of operations 1100 in a MME as the MME participates in a multiple point HO. Operations 1100 may be indicative of operations taking place at a MME as the MME participates in a multiple point HO from a source PP to a target PP.

The MME may receive a first message including a path switch request indicator from the target PP (block 1105). According to an example embodiment, the path switch request indicator informs the MME that there has been a change in PP. Furthermore, the first message includes information about enumerated evolved packet system (EPS) bearers whose packets should be sent to target PP 611 from now on. The information about the enumerated EPS bearers may be in the form of a list.

The MME may send a second message including a user plane update request indicator to a serving gateway (block 1110). According to an example embodiment, the second message includes an address of the target PP, as well as a list of the enumerated EPS bearers whose packets should be sent to the target PP from now on.

The MME may receive a third message including a user plane update response indicator from the serving gateway (block 1115). The MME may confirm the path switch with the target PP by sending a fourth message including a path switch request acknowledgement to the target PP (block 1120).

Figure 12:
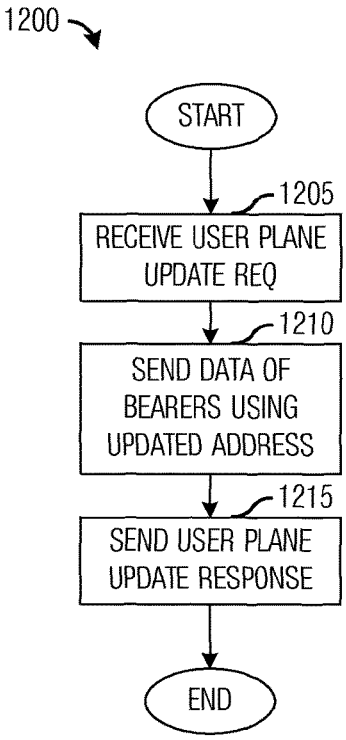
FIG. 12 illustrates an example flow diagram of operations in a serving gateway as the serving gateway participates in a multiple point HO according to example embodiments described herein.

FIG. 12 illustrates a flow diagram of operations 1200 in a serving gateway as the serving gateway participates in a multiple point HO. Operations 1200 may be indicative of operations taking place at a serving gateway as the serving gateway participates in a multiple point HO from a source PP to a target PP.

The serving gateway may receive a first message including a user plane update request indicator to a serving gateway (block 1205). According to an example embodiment, the first message includes an address of the target PP, as well as a list of the enumerated EPS bearers whose packets should be sent to the target PP from now on.

The serving gateway may start to send data packets of the enumerated EPS bearers to the target PP using the address received in the first message (block 1210). The serving gateway may also send a second message including a user plane update response indicator to the MME (block 1215).

Figure 13:
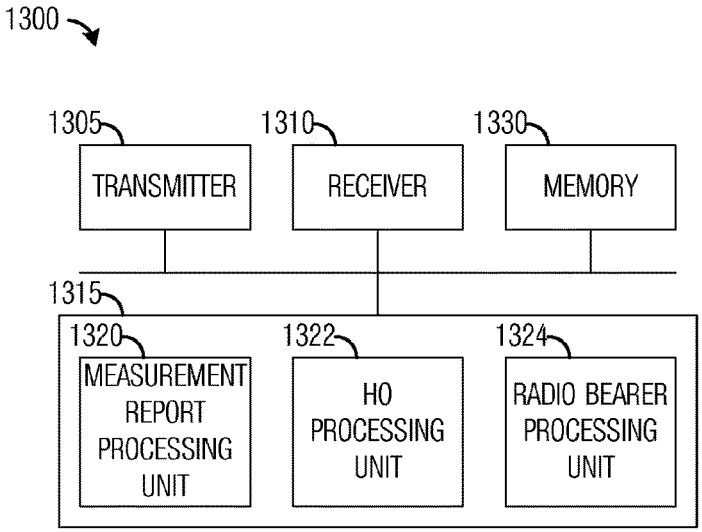
FIG. 13 illustrates an example first communications device according to example embodiments described herein.

FIG. 13 illustrates a first communications device 1300. Communications device 1300 may be an implementation of a multiple point controller. Communications device 1300 may be used to implement various ones of the embodiments discussed herein. As shown in FIG. 13, a transmitter 1305 is configured to send packets and a receiver 1310 is configured to receive packets. Transmitter 1305 and receiver 1310 may have a wireless interface, a wireline interface, or a combination thereof.

A measurement report processing unit 1320 is configured to process measurement reports from UEs (or communications points). Measurement report processing unit 1320 is also configured to solicit measurement reports from the UEs (or communications points). A HO processing unit 1322 is configured to coordinate a multiple point HO between a source PP and a target PP. HO processing unit 1322 is configured to determine changes in a multiple point configuration according to the resource report(s). HO processing unit 1322 is configured to initiate the multiple point HO.

A radio bearer processing unit 1324 is configured to make changes to radio bearers (including signaling and data radio bearers that are multiple point and/or non multiple point radio bearers) impacted by the multiple point HO. Radio bearer processing unit 1324 is configured to make changes to parameters, such as RRM/QoS parameters, of radio bearers. A memory 1330 is configured to store resource reports, multiple point configurations, radio bearer configurations and parameters, source PP and/or target PP information, radio bearer status, multiple point HO status, and the like.

The elements of communications device 1300 may be implemented as specific hardware logic blocks. In an alternative, the elements of communications device 1300 may be implemented as software executing in a processor, controller, application specific integrated circuit, and the like. In yet another alternative, the elements of communications device 1300 may be implemented as a combination of software and/or hardware.

As an example, transmitter 1305 and receiver 1310 may be implemented as a specific hardware block, while resource report processing unit 1320, HO processing unit 1322, and radio bearer processing unit 1324 may be software modules executing in a processor 1315, a microprocessor, a custom circuit, or a custom compiled logic array of a field programmable logic array.

Figure 14:
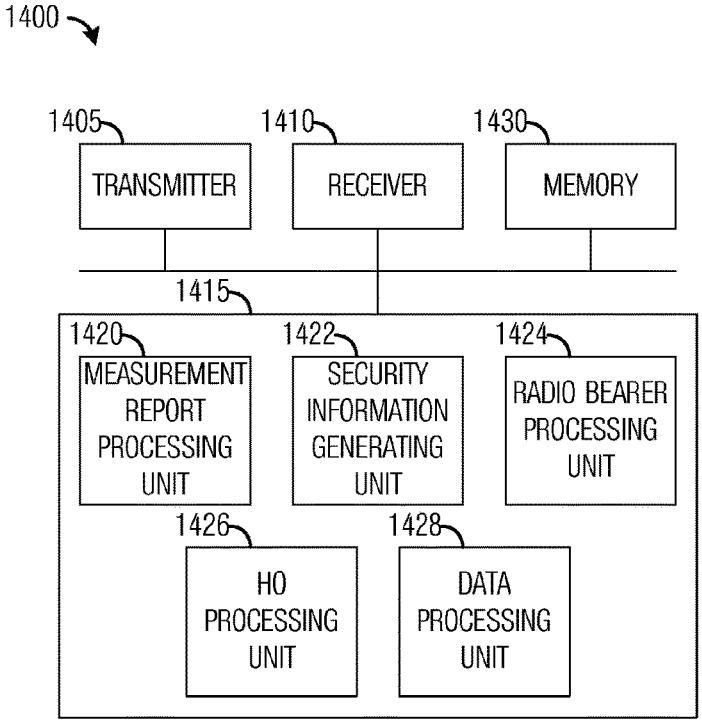
FIG. 14 illustrates an example second communications device according to example embodiments described herein.

FIG. 14 illustrates a second communications device 1400. Communications device 1400 may be an implementation of a communications point, an eNB, a BS, a RRH, and the like. Communications device 1400 may be used to implement various ones of the embodiments discussed herein. As shown in FIG. 14, a transmitter 1405 is configured to send packets and a receiver 1410 is configured to receive packets. Transmitter 1405 and receiver 1410 may have a wireless interface, a wireline interface, or a combination thereof.

A measurement report processing unit 1420 is configured to process measurement reports from UEs or communication points. Measurement report processing unit 1420 is configured to solicit measurement reports from UEs or communications points. A security information generating unit 1422 is configured to generate security information for UEs, communications points, secondary points, and the like, communicating with communications device 1400.

A radio bearer processing unit 1424 is configured to make changes to radio bearers (including signaling and data radio bearers that are multiple point and/or non multiple point radio bearers) impacted by the multiple point HO. Radio bearer processing unit 1424 is configured to make changes to parameters, such as RRM/QoS parameters, of radio bearers. A HO processing unit 1426 is configured to determine a need for a multiple point HO according to the measurement reports received from the UEs or communications points. HO processing unit 1426 is configured to generate messages to perform the multiple point HO. A data processing unit 1428 is configured to process received data and split the received data if necessary and forward the received data to the UEs or communications points according to radio bearer configuration. A memory 1430 is configured to store received data, measurement reports, radio bearer configurations and/or parameters, security information, and the like.

The elements of communications device 1400 may be implemented as specific hardware logic blocks. In an alternative, the elements of communications device 1400 may be implemented as software executing in a processor, controller, application specific integrated circuit, or so on. In yet another alternative, the elements of communications device 1400 may be implemented as a combination of software and/or hardware.

As an example, transmitter 1405 and receiver 1410 may be implemented as a specific hardware block, while measurement report processing unit 1420, security information generating unit 1422, radio bearer processing unit 1424, HO processing unit 1426, and data processing unit 1428 may be software modules executing in a processor 1415, a microprocessor, a custom circuit, or a custom compiled logic array of a field programmable logic array.

Although the present invention and its advantages have been described in detail, it should be understood that various changes, substitutions and alterations can be made herein without departing from the spirit and scope of the invention as defined by the appended claims.

What is claimed is:

1. A method for operating a multiple point (MP) controller, the method comprising:

receiving, from a source primary point, a handover required message for a user equipment coupled to the source primary point, the handover required message including target primary point information and MP radio bearer information for an MP radio bearer;

determining an MP configuration according to the handover required message;

sending, to a target primary point, a handover request message including the MP configuration and the MP radio bearer information;

[sending, to the source primary point, a handover message including the MP configuration, the MP radio bearer information, and reconfiguration information for the user equipment, the handover message initiating a handover of a subset of the MP radio bearer from the source primary point to the target primary point; and]

receiving, from the target primary point, a handover complete message indicating completion of [the] *a* handover*, the handover complete message including an update to the MP radio bearer information; and*

*sending, to the source primary point, a handover message including the MP configuration, the MP radio bearer information, and reconfiguration information for the user equipment, the handover message initiating the handover of a subset of the MP radio bearer from the source primary point to the target primary point.*

2. The method of claim 1, wherein the handover required message also includes target primary point security information.

3. The method of claim 1, wherein determining the MP configuration comprises:

changing a first MP radio bearer configuration for the source primary point according to the MP radio bearer information; and changing a second MP radio bearer configuration for the target primary point according to the MP radio bearer information.

4. The method of claim 1, wherein the handover required message further comprises non-MP radio bearer information for a non-MP radio bearer, and wherein determining the MP configuration further comprises:

removing the non-MP radio bearer from the source primary point; and adding the non-MP radio bearer at the target primary point.

5. The method of claim 1, wherein the MP radio bearer information includes an identifier of the MP radio bearer, and a parameter of the MP radio bearer.

6. The method of claim 5, wherein the parameter comprises a radio resource management parameter, a Quality of Service parameter, or a combination thereof.

7. The method of claim 1, wherein the handover request message also includes target primary point security information.

8. The method of claim 1, wherein the handover message also includes remaining MP radio bearer information for a remaining MP radio bearer that is retained at the source primary point after completion of the handover.

9. The method of claim 1, wherein the reconfiguration information includes *user equipment* identity information [assigned to the user equipment] at the target primary point, user equipment security information at the target primary point, the MP radio bearer information, remaining MP radio bearer information for a remaining MP radio bearer that is retained at the source primary point after completion of the handover, or a combination thereof.

[10. The method of claim 1, wherein the handover complete message includes an update to the MP radio bearer information.]

11. The method of claim 1, further comprising sending, to a secondary point, a second handover complete message indicating completion of the handover.

12. A multiple point (MP) controller comprising:

a receiver configured to receive, from a source primary point, a handover required message for a user equipment coupled to the source primary point, the handover required message including target primary point information and MP radio bearer information for an MP radio bearer, and to receive, from a target primary point, a handover complete message indicating completion of a handover*, wherein the handover complete message includes an update to the MP radio bearer information*;

a processor operatively coupled to the receiver, the processor configured to determine an MP configuration according to the handover required message; and a transmitter operatively coupled to the processor and to the receiver, the transmitter configured to send, to the target primary point, a handover request message including the MP configuration and the MP radio bearer information, and to send, to the source primary point, a handover message including the MP configuration, the MP radio bearer information, and reconfiguration information for the user equipment, the handover message initiating a handover of a subset of the MP radio bearer from the source primary point to the target primary point.

13. The MP controller of claim 12, wherein the processor is configured to change a first MP radio bearer configuration for the source primary point according to the MP radio bearer information, and to change a second MP radio bearer configuration for the target primary point according to the MP radio bearer information.

14. The MP controller of claim 12, wherein the handover required message includes non-MP radio bearer information for a non-MP radio bearer, and wherein the processor is configured to remove the non-MP radio bearer from the source primary point, and to add the non-MP radio bearer from the source primary point to the target primary point.

15. The MP controller of claim 12, wherein the transmitter is configured to send, to a secondary point, a second handover complete message indicating completion of the handover.

16. The MP controller of claim 12, wherein the handover required message also includes target primary point security information.

17. The MP controller of claim 12, wherein the MP radio bearer information includes an identifier of the MP radio bearer, and a parameter of the MP radio bearer.

18. The MP controller of claim 17, wherein the parameter comprises a radio resource management parameter, a Quality of Service parameter, or a combination thereof.

19. The MP controller of claim 12, wherein the handover request message also includes target primary point security information.

20. The MP controller of claim 12, wherein the handover message also includes remaining MP radio bearer information for a remaining MP radio bearer that is retained at the source primary point after completion of the handover.

21. The MP controller of claim 12, wherein the reconfiguration information includes *user equipment* identity information [assigned to the user equipment] at the target primary point, user equipment security information at the target primary point, the MP radio bearer information, remaining MP radio bearer information for a remaining MP radio bearer that is retained at the source primary point after completion of the handover, or a combination thereof.

[22. The MP controller of claim 12, wherein the handover complete message includes an update to the MP radio bearer information.]

* * * * *